United States Patent [19]
Schaller et al.

[11] Patent Number: 5,601,078
[45] Date of Patent: Feb. 11, 1997

[54] BREATHING APPARATUS WITH A DISPLAY UNIT

[75] Inventors: Uwe Schaller; Detlef Wolter, both of Jena; Hansjochen Schuck, Stockelsdorf; Ralf Drews, Lübeck, all of Germany

[73] Assignee: Drägerwerk AG, Lübeck, Germany

[21] Appl. No.: 447,231

[22] Filed: May 22, 1995

[30] Foreign Application Priority Data

Jul. 16, 1994 [DE] Germany .......................... 44 25 262.5

[51] Int. Cl.$^6$ .............................................. A62B 18/08
[52] U.S. Cl. ............... 128/205.23; 128/201.24; 128/202.13; 128/202.22; 128/206.21
[58] Field of Search ............ 128/201.22, 201.24, 128/202.22, 205.23, 206.23, 201.19, 202.13, 206.21; 2/422

[56] References Cited

U.S. PATENT DOCUMENTS

| | | | |
|---|---|---|---|
| 4,068,924 | 1/1978 | Kotani | 350/160 |
| 4,181,916 | 1/1980 | Hendersen | 358/27 |
| 4,298,802 | 11/1981 | Quella et al. | 250/484 |
| 5,018,837 | 5/1991 | McKee et al. | 350/345 |
| 5,166,532 | 11/1992 | Brunner et al. | 250/548 |
| 5,301,668 | 4/1994 | Hales | 128/205.26 |

FOREIGN PATENT DOCUMENTS

| | | | |
|---|---|---|---|
| 0622030 | 2/1994 | European Pat. Off. | 2/422 |
| 3317057 | 4/1987 | Germany | G01B 11/04 |
| 3622147 | 10/1988 | Germany | A62B 18/08 |
| 4340971A1 | 9/1994 | Germany . | |
| 2273054 | 6/1994 | United Kingdom | A62B 18/08 |

*Primary Examiner*—V. Millin
*Assistant Examiner*—V. Srivastava
*Attorney, Agent, or Firm*—McGlew and Tuttle

[57] ABSTRACT

A breathing apparatus with a display unit for the transmission of measured data via a display field of the display unit into the field of vision of a person wearing the unit. The readability of the measured data displayed is improved in daylight with simultaneously reduced energy demand. The display field includes an LC display, which is at least transparent for transmission radiation. An optical concentrator is provided, which collects the ambient light via a light entering surface and emits the collected light via a light exiting surface.

17 Claims, 3 Drawing Sheets

BREATHING APPARATUS WITH A DISPLAY UNIT

FIELD OF THE INVENTION

The present invention pertains to a breathing apparatus with a display unit for the transmission of measured data via a display field of the display unit into the field of vision of a person wearing the unit.

BACKGROUND OF THE INVENTION

A breathing apparatus with a breathing mask for the supply of breathing gas during operations underground or in an atmosphere containing hazardous materials and with a display unit for measured data within the breathing mask has become known from DE-C 36 22 147. The measured signals that are supplied via a signal line, such as, e.g., the cylinder pressure of carried pressurized cylinders, are analyzed and evaluated in a signal processing unit and reported to the person wearing the unit via a display field of the display unit within the breathing mask. The display field usually consists of LED (light emitting diode) elements, which are fed from an energy source located in the signal processing unit. In this case, it is disadvantageous that a major part of the energy reserves stored in the energy source is exhausted by the operation of the LED elements. To make matters worse, during operations in sunlight, the luminous power of the LED elements must be increased by increasing the feed current, so that the display field can still be read satisfactorily, whereby, however, the energy reserves decrease even more rapidly. In contrast, during operations underground, low luminous intensities of the LED elements are sufficient to be able to still read the display field satisfactorily.

A photoelectric sensor with a light source with a receiver aligned with the light source and with a light-focusing element in front of the receiver has become known from DE-C 33 17 057. A fluorescent, monochromatic plastic having light-collecting properties (LISA plastic), which receives the light radiated by the light source via a light entering surface and which conveys the collected light to the receiver via a light exiting surface, is used as a light-focusing element. This plastic absorbs direct or diffuse light, which it absorbs via its light entering surface, from the environment. This light is emitted as fluorescent radiation in the plastic matrix, as it is conveyed to the light exiting surface by total reflection and released there. Light with wavelengths greater than 370 nm is suitable for such a light conversion.

SUMMARY AND OBJECTS OF THE INVENTION

The primary object of the present invention is to improve a breathing apparatus with a display unit in terms of the readability of the display field in daylight with simultaneously reduced energy demand.

The object is attained in that the display field is comprised of an LC (liquid crystal) display, which is at least transparent for transmission radiation, and in that an optical concentrator, which collects the ambient light via a light entering surface and emits the collected light via a light exiting surface behind the LC display, is provided as the transmission radiation source.

The advantage of the present invention lies essentially in the fact that ambient light is focused in an optical concentrator and is then used for the irradiation of an LC display. In this manner, the readability of the display field becomes better, the greater the luminous intensity of the ambient light is. Only the energy demand of the LC display, which is very low, must thus be met in order to guarantee a good readability of the display field in daylight. Unfortunately, additional illumination is necessary during the hours of total darkness. Elements made of transparent material having the highest possible refractive index are suitable as the optical concentrators. These elements receive the ! diffused light from the environment via a light entering surface and reflect essentially via total reflection to a light exiting surface. Such optical concentrators are used, for example, in solar collectors and in solar cells as well.

The display unit in accordance with the present invention may be used in conjunction with a breathing apparatus for the supply of breathing gas for pilots, firefighters, or rescue squads underground, or in conjunction with a safety helmet. The display unit may also be used in diving masks or helmet diving equipment.

The optical concentrator with its light entering surface is attached in an advantageous manner along a holding clamp, which can be placed on a mask body of a breathing mask, and the LC display is arranged on the holding clamp as well. Thus, the display unit can be placed onto the breathing mask and be removed again in a simple manner. The display field is positioned such that it lies on the face shield of the breathing mask from the outside, and it is aligned with the field of vision of the person wearing the unit.

The display surface of the LC display is preferably deflected by means of an optical transmitter into the field of vision of the person wearing the unit. The transmitter may be designed as a deviation mirror with downstream collimator lens, whereby the display of the LC display with the collimator lens is also visible even with slight positional errors of the eyes.

A ball-and-socket joint, with which the image of the display surface can be aligned with the pupil of the eye of the person wearing the unit, is preferably provided between the light exiting surface of the optical concentrator and the LC display.

The optical concentrator advantageously consists of a fluorescent, monochromatic plastic with light-collecting properties, a so-called LISA plastic. The optical concentrator may be designed as a plate, a tube or as a rod, in which case a rod can be produced in an especially simple manner. A LISA plastic is preferably selected for the wavelength range of about 550 nm, since the eye sensitivity is the greatest in this range.

The transmission radiation emerging from the LC display is preferably directed at least piece-wise through a tube to the face shield, and a sealing element is provided for sealing the tube against the face shield. The tube is essentially used to shield the radiation emerging from the LC display against diffused light from the environment, and the penetration of moisture into the tube should be stopped with the sealing element. The sealing element may be designed, for example, as a silicone disk or as an elastomer bellows.

An additional light source, which irradiates the LC display and is used to illuminate the LC display if the ambient light intensity is not sufficient, is preferably provided.

A photoelectric sensor, which detects the ambient light intensity and which influences the light intensity of the additional light source depending on the ambient light intensity, is advantageously provided.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
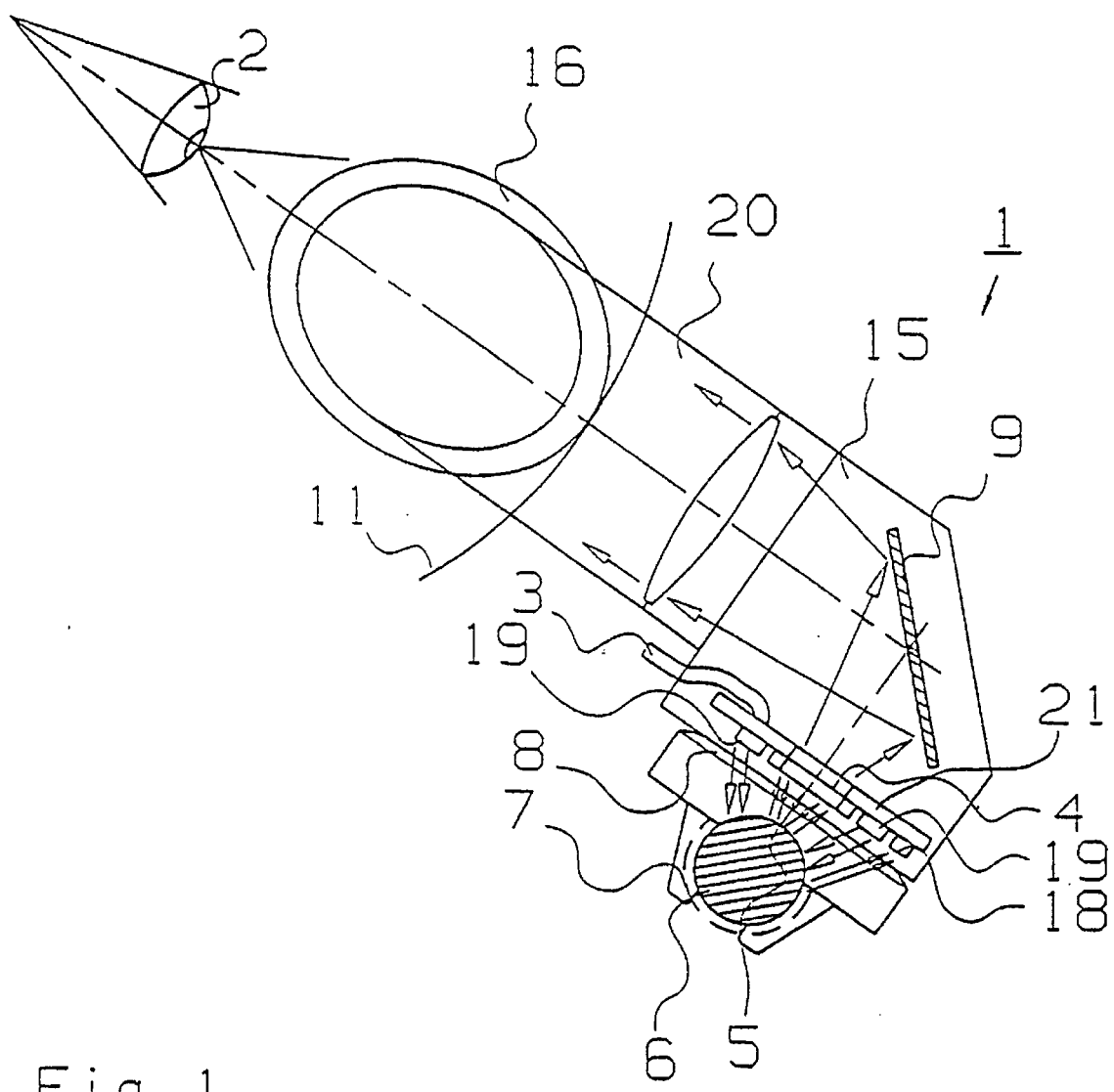
FIG. 1 is a schematic representation of a display unit.

FIG. 1 shows schematically a display unit 1 for the transmission of measured data into the field of vision of a person wearing the unit, and only the pupil 2 of this person's eye is shown in FIG. 1. The measured data, which are transmitted via a signal line 3, are shown on an LC display 4 as a display field in the form of alphanumeric characters and symbols. The LC display 4, which is transparent for transmission radiation, is irradiated from a light exiting surface 5 of a LISA plastic rod 6. The LISA plastic rod 6, designated below as the LISA rod 6, is comprised of a fluorescent, monochromatic plastic with light-collecting properties, whereby the light penetrates as ambient light into the LISA rod 6 via a light entering surface 7. The light emerging from the light exiting surface 5 reaches the LC display 4 via a ball-and-socket joint 8. With the ball-and-socket joint 8 display unit 1 can be aligned with the pupil of the eye 2. From the LC display, the light travels via a deflection mirror 9 and a collimator lens 10, which generates a virtual, almost infinite image to the pupil of the eye 2 of the person wearing the unit. A face shield 11 of a breathing mask, which is also not shown in FIG. 1, lies between the collimator lens 10 and the pupil of the eye 2. The LC display 4 is attached to a mounting plate 2, on which another two light sources 19 and a photoelectric sensor 18 are additionally arranged. The light sources 19 and the photoelectric sensor 18 are both aligned with the LISA rod 6. The light emitted by the light sources 19 is reflected at the light exiting surface 5 in the direction of the LC display 4, and the light irradiates this display in the same manner as the ambient light that is collected by the LISA rod 6. The photoelectric sensor 18 receives both a part of the light that is reflected by the light sources 19 at the light exiting surface 5 and a part of the ambient light that is collected by the LISA rod 6. The light sources 19 and the photoelectric sensor 18 are connected, at an evaluation control element that is not shown in FIG. 1, with an energy source, which controls the light intensity of the light sources 19 as a function of the measured signal supplied by the photoelectric sensor 18 if the ambient light collected by the LISA rod 6 is not sufficient to illuminate the LC display 4 completely.

Figure 2:
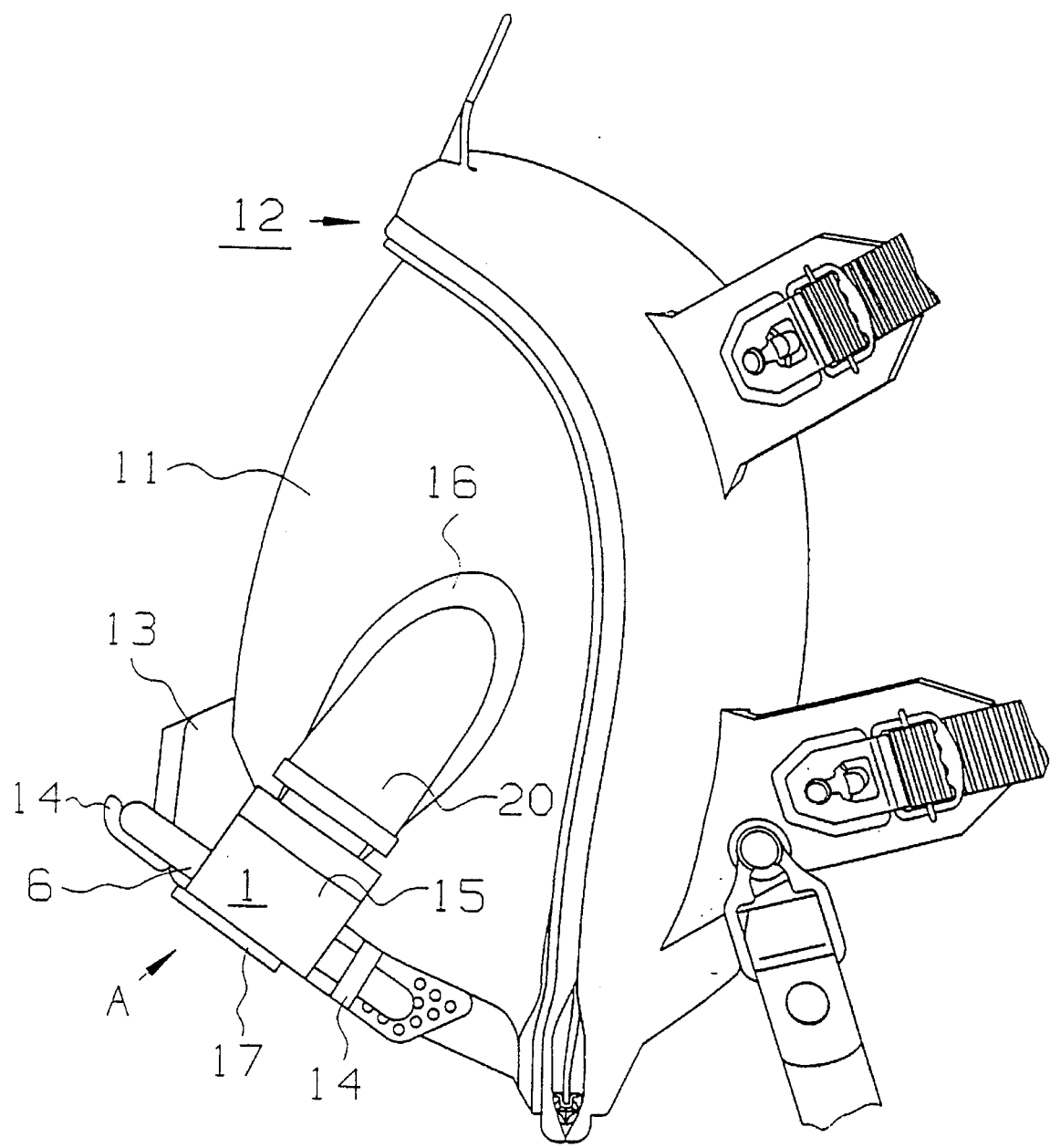
FIG. 2 is a partially sectional view of a breathing mask with a display unit according to FIG. 1, attached to a holding clamp.

FIG. 2 shows a breathing mask 12 with the display unit 1 with the LISA rod 6 arranged on a holding clamp 13. The LISA rod 6 is fixed to the holding clamp 13 by means of fixing eyelets 14. The same components are designated by the same reference numbers as in FIG. 1. The collimator lens 10, the deflection mirror 9, the LC display 4, and the ball-and-socket joint 8 of the display unit 1, FIG. 1, are accommodated in a housing 15. A tube 20, which shields the collimator lens 10 against diffused light and which, with its seal 16, is pressed in a waterproof manner on the face shield 11 of the breathing mask, is provided as an extension of the housing 15. The holding clamp 13 is attached to a breathing connection 17 of the breathing mask 12. The breathing mask 12 shown in FIG. 2 is a so-called full-view mask, in which the transparent face shield 11 encloses the face of the person wearing the mask and at the same time is the mask body.

Figure 3:
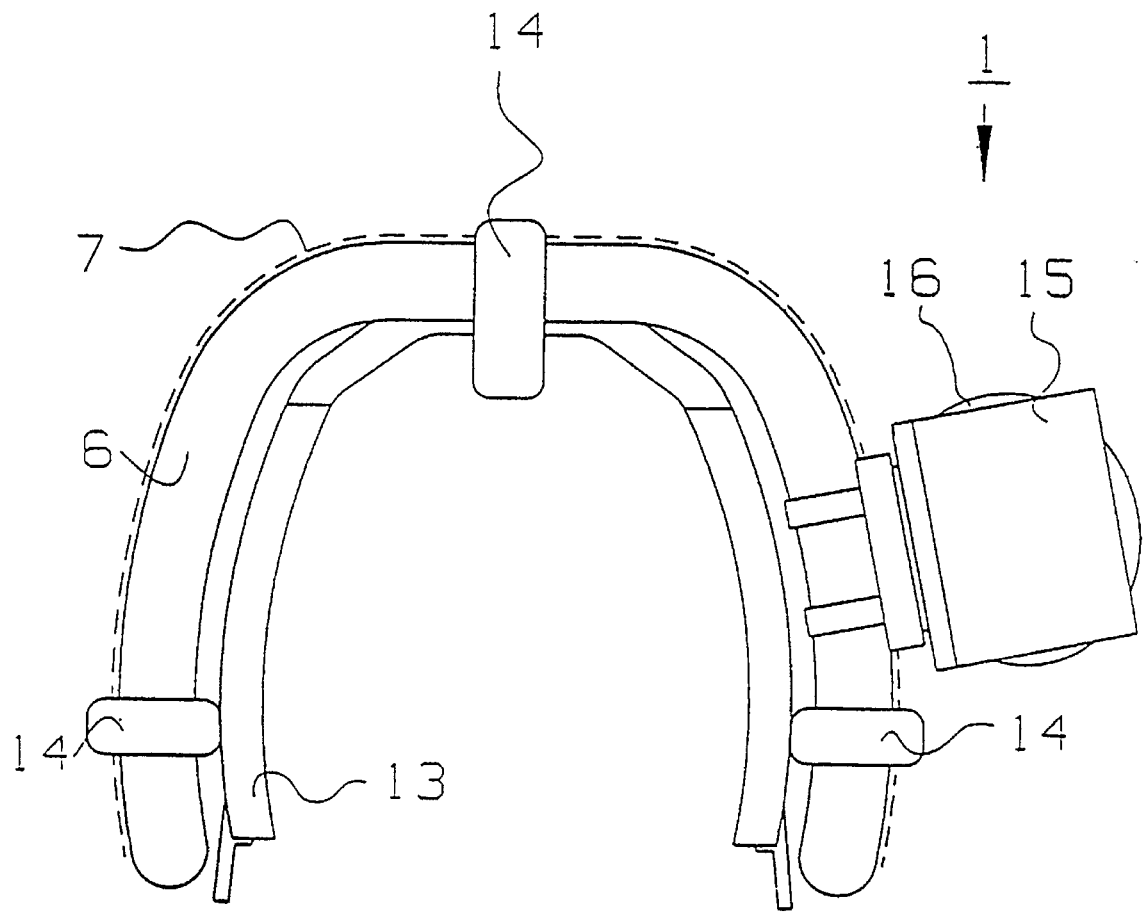
FIG. 3 is a view taken in the direction of arrow "A" according to FIG. 2, showing the holding clamp.

FIG. 3 shows the holding clamp 13 in the view "A" according to FIG. 2. The same components are designated by the same reference numbers as in FIGS. 1 anal 2. The light entering surface 7 is illustrated by a broken line in FIG. 3 in order to show that the ambient light is collected along the entire length of the LISA rod 6.

While a specific embodiment of the invention has been shown and described in detail to illustrate the application of the principles of the invention, it will be understood that the invention may be embodied otherwise without departing from such principles.

What is claimed is:

1. A breathing apparatus with a display unit for the transmission of measured data via a display field of the display unit into a field of vision of the person wearing the breathing apparatus, comprising:

a breathing mask with mask body;

an LC display forming said display field, said LC display being viewable from within the mask body, said LC display being transparent at least for transmission radiation, said breathing mask having a face shield, a tube being provided between said LC display and said face shield, whereby the transmission radiation emerging from the LC display is directed at least piece-wise through said tube to said face shield, a sealing element being provided between said tube and said face shield;

an optical concentrator, including means disposed outside said mask body for collecting ambient light via a light entering surface and including means for emitting collected light via a light exiting surface toward said LC display, said optical concentrator being provided as said transmission radiation source for said LC display;

an additional light source positioned for irradiating said LC display; and a photoelectric sensor positioned for detecting ambient light intensity, said photoelectric sensor being actively connected to said additional light source for controlling a light intensity of said additional light source as a function of the ambient light intensity.

2. A breathing apparatus according to claim 1, further comprising a holding clamp which is detachable on said mask body, said optical concentrator with said light entering surface being attached along said holding clamp.

3. A breathing apparatus according to claim 2, wherein said LC display is arranged on said holding clamp.

4. A breathing apparatus according to claim 1, further comprising means for deflecting said LC display, including an optical transmitter for deflecting said LC display into a field of vision of the person wearing the unit.

5. A breathing apparatus according to claim 1, wherein a ball-and-socket joint is provided between said light entering surface of said optical concentrator and said LC display.

6. A breathing apparatus according to claim 1, wherein said optical concentrator is formed of a fluorescent, monochromatic plastic with light-collecting properties.

7. A breathing apparatus according to claim 1, wherein said optical concentrator is essentially rod-shaped.

8. A breathing apparatus according to claim 1, wherein said optical concentrator is adjusted to a wavelength and a range of 550 nm.

9. A breathing apparatus, comprising:

a breathing mask with a display unit, said display unit being provided for the transmission of data via a display field of the display unit into the field of vision of the person wearing the unit;

an LC display forming said display field, said LC display being transparent at least for transmission radiation, said LC display having a viewing side and a transmission radiation supply side;

an optical concentrator, formed of a fluorescent, monochromatic plastic with light collecting properties including means disposed outside said mask body for collecting ambient light via a light entering surface and including means for emitting collected light via a light exiting surface toward said LC display transmission radiation supply side, said optical concentrator being provided as a source of said transmission radiation for said LC display, said breathing mask including a face shield and a tube provided between said LC display and said face shield, transmission radiation emerging from said LC display being directed through said robe to said face shield, a sealing element provided between said tube and said face shield.

10. A breathing apparatus according to claim 9, further comprising an additional light source positioned for irradiating said LC display.

11. A breathing apparatus according claim 9, further comprising a photoelectric sensor positioned for detecting collected light intensity, said photoelectric sensor being actively connected to said additional light source for controlling a light intensity of said additional light source as a function of the collected light intensity.

12. A breathing apparatus according to claim 9, further comprising a breathing mask with a mask body and a holding clamp which is detachable on said mask body, said optical concentrator with said light entering surface being attached along said holding clamp.

13. A breathing apparatus according to claim 12, wherein said LC display is arranged on said holding clamp.

14. A breathing apparatus according to claim 9, further comprising means for deflecting said LC display into a field of vision of the person wearing the unit.

15. A breathing apparatus according to claim 9, wherein a ball-and-socket joint is provided between said light entering surface of said optical concentrator and said LC display.

16. A breathing apparatus, comprising:

a breathing mask with a display unit, said display unit being provided for the transmission of data via a display field of the display unit into the field of vision of the person wearing the unit;

an LC display forming said display field, said LC display being transparent at least for transmission radiation;

an optical concentrator, formed of a fluorescent, monochromatic plastic with light-collecting properties providing means disposed outside said mask body for collecting ambient light via a light entering surface and including means for emitting collected light via a light exiting surface, said light exiting surface being directed toward said LC display to backlight said LC display for providing said transmission radiation source for said LC display;

an additional light source positioned for irradiating said LC display either directly or via reflection at said light exiting surface; and a photoelectric sensor positioned for detecting collected light intensity, said photoelectric sensor being actively connected to said additional light source for controlling a light intensity of said additional light source as a function of said ambient light intensity.

17. As breathing apparatus according to claim 16, further comprising a holding clamp which is detachable on said mask body, said optical concentrator with said light emitting surface being attached along said holding clamp, said breathing mask including a face shield, a tube provided between said LC display and said face shield, whereby said transmission radiation emerging from said LC display is directed through said tube to said face shield, a sealing element being provided between said tube and said face shield and a ball and socket joint provided between said light entering surface of said optical concentrator and said LC display for aligning the display unit with a pupil of an eye of a wearer of the breathing apparatus.

* * * * *